United States Patent [19]

Cosgrove et al.

[11] 4,180,709
[45] Dec. 25, 1979

[54] DATA COLLECTION SYSTEM USING TELEPHONE LINES

[75] Inventors: John D. Cosgrove, Playa Del Rey, Calif.; Charles D. Pettis, Panaca, Nev.; Charles E. Mullett, Playa Del Rey, Calif.

[73] Assignee: International Tel Data Corporation, Las Vegas, Nev.

[21] Appl. No.: 877,104

[22] Filed: Feb. 13, 1978

[51] Int. Cl.² .......................................... H04M 11/00
[52] U.S. Cl. ............................................... 179/2 AM
[58] Field of Search .................. 179/2 A, 2 AM, 2 R, 179/2 C

[56] References Cited

U.S. PATENT DOCUMENTS

| | | | |
|---|---|---|---|
| 3,564,143 | 2/1971 | Stewart, Jr. | 179/2 A |
| 3,922,490 | 11/1975 | Pettis | 179/2 A |
| 4,022,977 | 5/1977 | Nomura | 179/2 AM |

Primary Examiner—William C. Cooper
Attorney, Agent, or Firm—John E. Wagner

[57] ABSTRACT

A circuit and a computer program for enabling the monitoring of a plurality of switch settings at remote sites by central telephone exchange equipment through regular telephone lines is described. To compensate for slow drift variations in line impedance, the impedance of each line is continually calculated from the measurements, and any small change is used to update a line impedance correction factor, while any large instantaneous change is used to update the data counter. Telephone exchange battery variations which may be large and instantaneous, are compensated for by measuring the battery voltage immediately prior to measuring the line impedances, and correcting the line impedance readings with a battery voltage correction factor. Other types of temporary signal interference which are frequently present in telephone switching equipment are identified and rejected by applying consistency criteria to multiple readings which have been corrected by the aforementioned method. Using these techniques, long distance telephone lines may be used to monitor the settings of switches in parallel or series with selected resistances even where the variations in battery voltage, line impedance and signal interference may produce voltage variations on the telephone lines which may exceed the voltage variations produced by the switched resistance by a factor of five or more.

15 Claims, 4 Drawing Figures

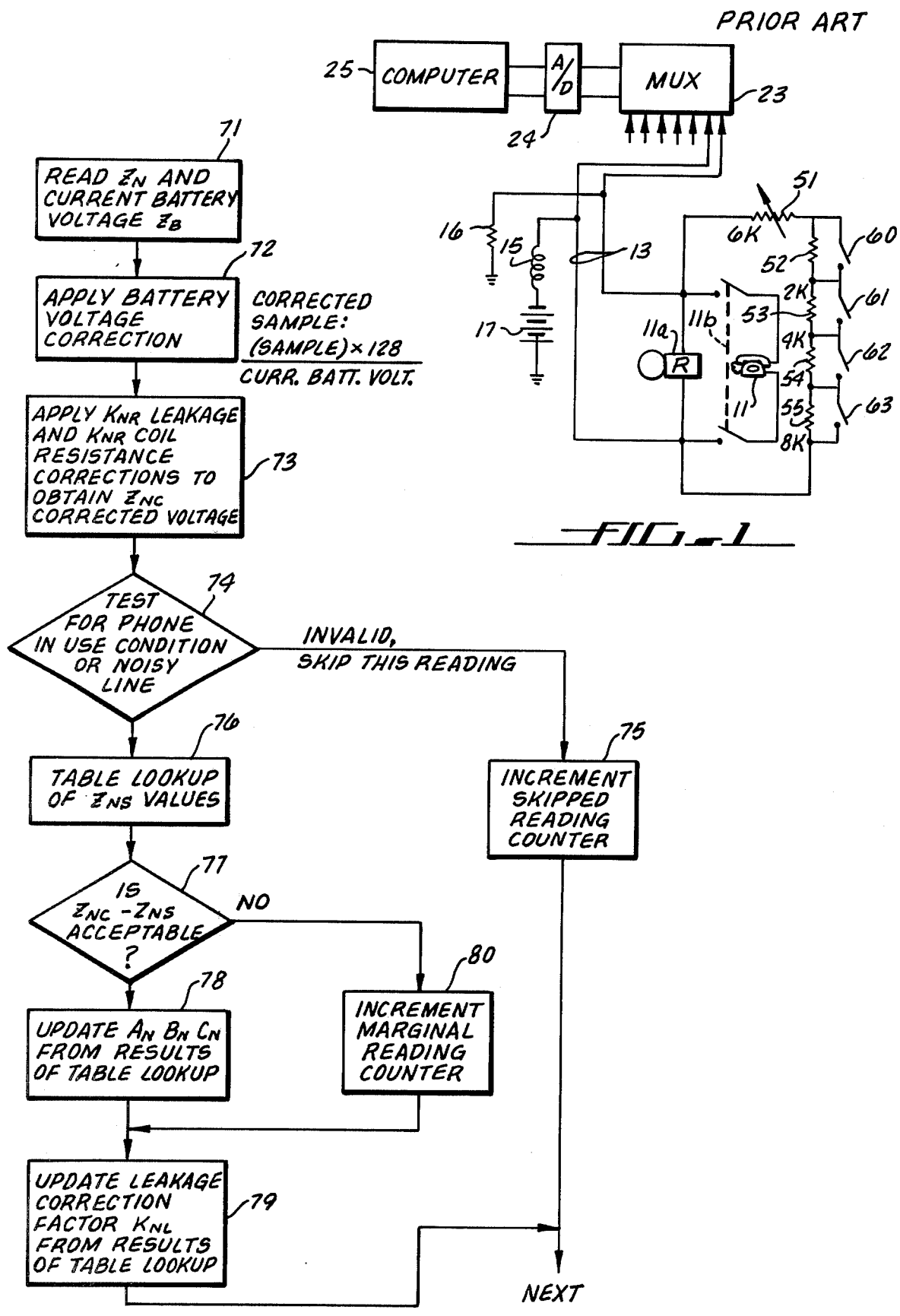

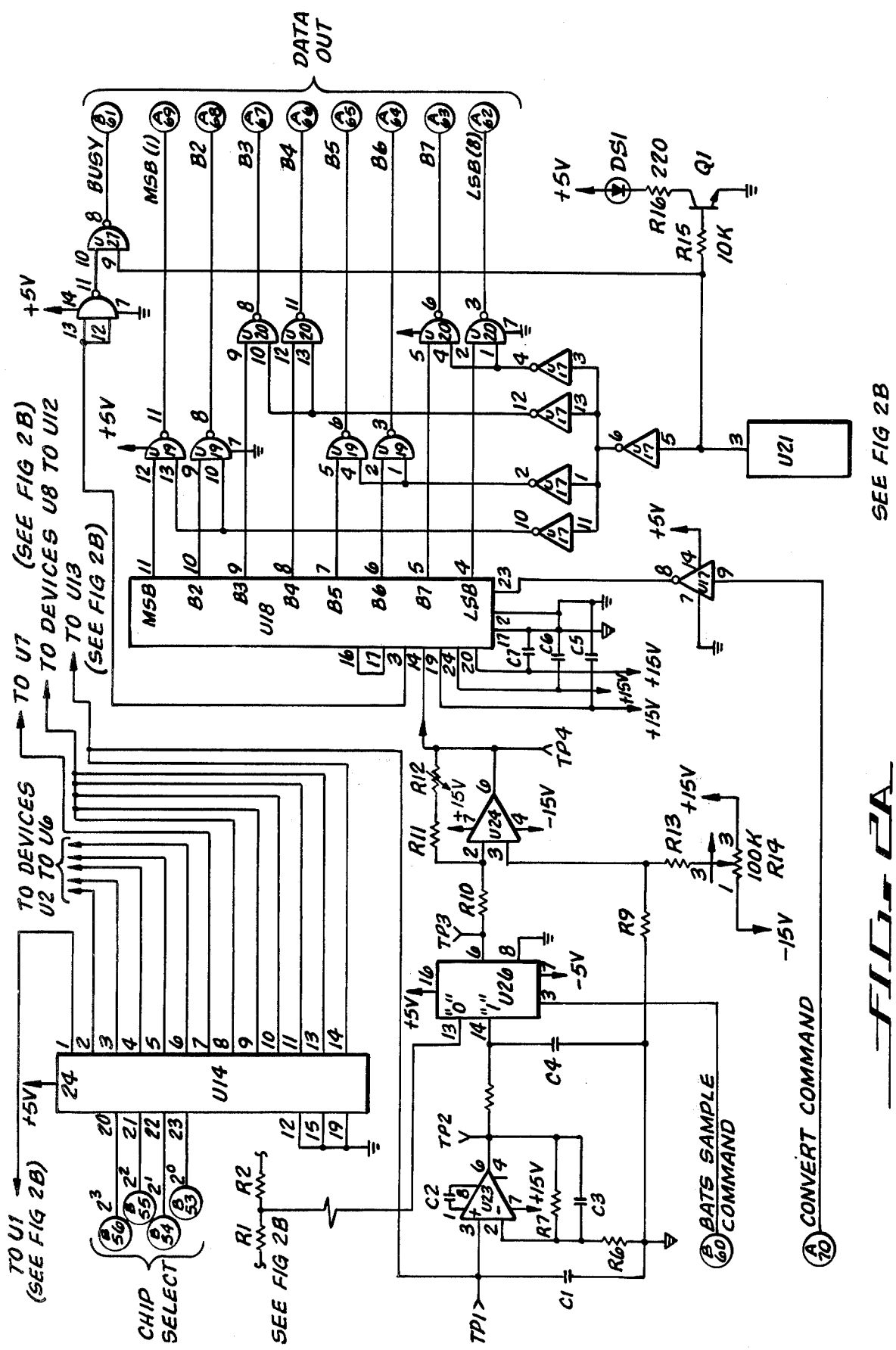

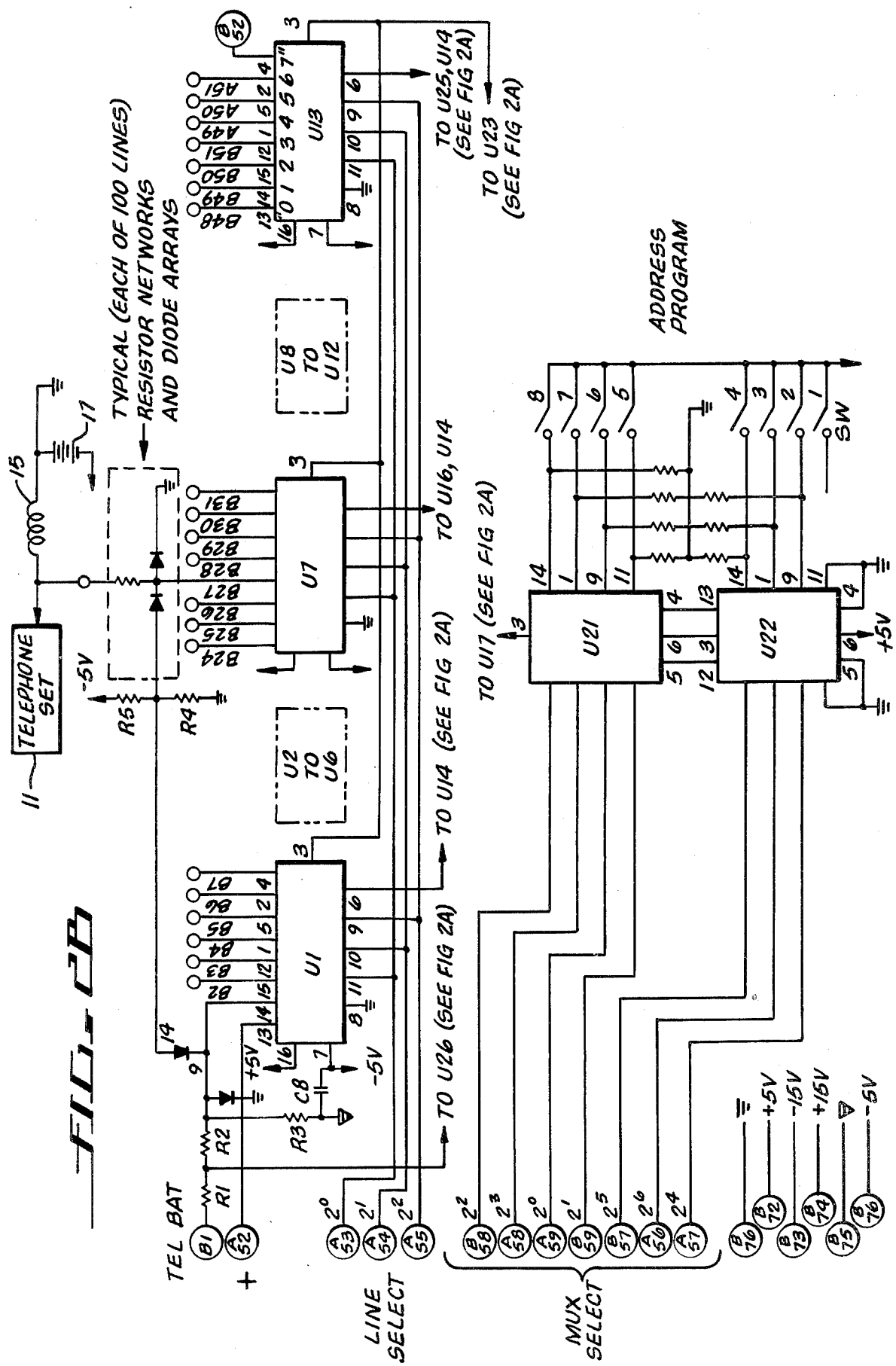

DATA COLLECTION SYSTEM USING TELEPHONE LINES

BACKGROUND OF THE INVENTION

This inventive method and apparatus is used for the remote sensing of digitally encoded data through voice-grade telephone lines, and more specifically describes a central computer and associated circuits connected to user sites by telephone lines to detect switch closures at the remote sites.

Equipment at a central location capable of automatically sensing digitally encoded information at a plurality of remote sites would be valuable to the utility companies and others who have a requirement for periodically updating numerical data from remote sites. The present practice at the utility companies is to have meter readers visit each building every month to record the information. At the central office these records are transcribed into machine readable form and entered into a computer.

An improved method requires digital encoding apparatus at the users site and a recording instrument, usually comprising a tape recorder, carried by the meter reader. When the portable recording apparatus is coupled to the encoding apparatus at the users site, the customer ID number and the current meter reading is automatically recorded on magnetic tape in machine readable form. Using this method, the transcription step from paper copy to machine readable form at the central location is avoided, but the meter reader still must visit each user's site.

The problem is compounded when the data required is to be updated daily or hourly. This would be necessary, for instance, in a large factory where power usage (water usage, etc.) is to be monitored for the purpose of conserving energy or avoiding high peak usage at specific times of the day. In this example, an automatic system would be advantageous since it would avoid the requirement of meter reading personnel and also allow real time control of the power (water) through the use of the computerized reading apparatus to generate usage commands to control the utility being measured. Of course, dedicated phone lines or hard wiring of any kind to the central location will accomplish the function, but at high cost. A method of accomplishing the reading of this digital data through the use of telephone lines already installed without interruption of the telephone service would accomplish the result at low cost.

An improved method and apparatus for using phone lines to monitor remote switches is described in U.S. Pat. No. 3,922,490, Alarm and Utility Meter Reading System Employing Telephone Lines, by Charles D. Pettis, and is incorporated herein by reference. This patent describes apparatus comprising a series of resistances in parallel or series with the telephone at the users location and a set of switches, each of which, when closed, shorts out one resistor. With the use of a particular set of resistance values, sensors at the central location can determine which switches are closed. By attaching each switch to a dial (usually the least significant) of any utility monitoring device, by initializing the central computer meter data, and by using each sensed switch closure to update the data, an automatic system can be implemented.

This system may be usable over short distances. For example, the electricity usage in one building may be accurately monitored. However, noise problems become apparent at longer distances. For instance, the noise generated on telephone lines connecting residential houses over several square miles exceeds the signal value by a factor of five or more. Since the telephone equipment cannot be modified a method of reading small digital signals in a high ambient noise background is required.

SUMMARY OF THE INVENTION

The inventive apparatus is capable of reading low level changes of resistance on ordinary telephone lines through the use of two techniques for compensating for changes of telephone line resistance and mainframe battery voltage which are the two primary noise sources.

The changes in line resistance, which includes changes in current leakage to ground, present a serious problem since the change of line resistance can far exceed the smallest switched resistance change. However, the line resistance changes slowly while the data resistance changes in discrete steps. The inventive apparatus takes advantage of this difference by measuring the line resistance at frequent intervals, perhaps once every thirty seconds.

Any small change is assumed to be a change of line resistance, and the line resistance value stored in the computer is updated. Any large change is assumed to be a switch change, and the utility data is updated. In this way, switched changes of resistance in 1,000 ohms steps can be monitored while the line resistance is varying over a range of several thousand ohms during a day.

A second source of line noise is generated by the variation of battery voltage at the telephone company central exchange where the monitoring equipment is located. The line resistance is actually measured indirectly since the voltage at the connecting line between the headset and the line relay is the actual measured quantity.

This measured voltage is subject to variations caused by battery voltage variations of up to four volts, 47–51 volts being the nominal range. Moreover, these changes may occur instantaneously, as large numbers of telephones are switched in and out at the main frame.

To compensate for this noise source, the battery voltage is measured just before the line resistance measurement. Any variation of battery voltage is converted into a correction factor and is used to correct all subsequent resistance readings.

Additionally, the series resistance of the line relay which is used to compute the switch states at the metered end varies from one relay to another. The effect of this actual value on the measured voltage is maintained as a unique factor for each line in the computer storage locations for that line. This unique factor is then used to correct all subsequent resistance readings. The line relay correction factor is computed at the time of encoder installation by means of a simple calibration procedure performed immediately prior to the connection of the encoder to the telephone line.

By the use of these techniques, the noise and variables inherent in telephone lines can be compensated for, allowing digitally encoded data at remote sites to be reliably read at the central telephone company location.

BRIEF DESCRIPTION OF THE DRAWINGS

FIG. 1 is the prior art remote switch sensing arrangement;

FIGS. 2A and 2B are a schematic diagram of the circuitry required to interface between the computer and a plurality of remote sites through telephone lines; and FIG. 3 is a flow chart of the program required by this system.

DETAILED DESCRIPTION OF THE PREFERRED EMBODIMENT

FIG. 1 is a simplified schematic of the prior art system in which the inventive apparatus is used. The telephone set 11 is in series with the switch hook contacts 11b and in parallel with the ringer 11a. The telephone set is also in parallel with a series of resistances 51 through 55 with nominal values of 6k, 1k, 2k, 4k and 8k ohms respectively. In addition, each resistor 52 through 55 has a switch in parallel with it. Thus, a resistance measurement across the telephone set, with the receiver on the hook, would indicate a resistance of between 6k and 21k ohms.

In actual practice, the line impedance in line 13 is about 1k ohm, and more importantly, the "leakage" resistance between tip and ring and/or to ground may be as low as 40K ohms. Since the voltage measurement is taken from the high side of the telephone set to ground, resistances 51 through 55 are in parallel with the leakage resistance. This sets the upper limit on the resistance values of resistors 51 through 55. Values much higher than a total of 20k ohms would not be measurable in parallel with a leakage resistance of 40k ohms, especially when that leakage resistance may drop significantly during bad weather. Noise problems also become more severe when the line impedance is raised through the use of higher resistance values.

Nor can the resistance values be lowered significantly. In FIG. 1 the smallest change of resistance that must be measured is 1k ohm. Smaller values of resistance steps would make the discrimination problem more difficult in that the changes in voltage caused by switch settings would begin to approach the effects of the short term noise variations.

Again referring to FIG. 1, the voltage at a plurality of lines can be measured sequentially by means of a multiplexer 23 and an analog to digital converter 24, which supplies the data to a computer, 25, for discrimination and accumulation purposes.

TELEPHONE LINE SIGNAL MULTIPLEXER

FIGS. 2A and 2B are a schematic diagram of the electrical circuit used in this system. One hundred telephone lines are connected to the input of multiplexer U1 through U13 of FIG. 2B. Due to redundance, ten of these multiplexers have been deleted from the figure. Each multiplexer has eight inputs.

The actual input coupling circuit is shown in detail at the input of multiplexer U7. The voltage at the junction between the telephone set 11 and the line relay 15 is first coupled through a resistor and diode network to limit the voltage input at the multiplexer U7. This is necessary to prevent spurious voltage spikes on the telephone lines from damaging the multiplexer. Each multiplexer is controlled by three control lines, A53, A54 and A55, from the computer, to couple the selected input voltage to the output, pin 6.

Similarly, four chip select lines, B53 through B56 of FIG. 2A, select one of thirteen chips. The one of one hundred lines thus selected is coupled on the bus connecting all multiplexer output pins, pin 3, to the input of operational amplifier U23, configured as a linear amplifier, with resistor R7 setting the amplifier gain factor. This amplified output is then switched through switch element U26 to amplifier U24, the gain of which is set by fixed resistor R11 and variable resistor R12. The signal is then converted to an eight bit binary representation by analog to digital converter U18 and coupled to the computer on eight parallel lines A62 through A69.

As described above, one of one hundred input signals can be selected for transmission to the computer. However, there are also a plurality of multiplexer boards, one hundred being a representative number. To select the output of a particular board, the MUX SELECT signal is sent from the computer to lines A56 through A59 and B57 through B59. Devices U21 and U22 compare the input with the state of switches SW2 through SW8 and enable the A to D outputs if there is a match. In practice, these switches may be replaced by jumpers external to the circuit board. Since the A to D output gates U27, U19 and U20 are open collector devices, the outputs of all multiplexer boards are ORed together simply by connecting all outputs in parallel. In this way, ten thousand telephone lines may be sequentially measured by this system.

BATTERY VOLTAGE CORRECTION

Prior to this sequence, the battery voltage is measured. Line B1 couples the voltage through a divider comprising R1, R2 and R3 to the other input of the U26 switch. Under computer control through line B60 this switch will couple this voltage to the amplifier U24 and A to D converter U18 for output to the computer.

To summarize FIG. 2, under computer control any of one hundred telephone line inputs or the battery voltage input may be selected, digitized, and coupled to the computer from any selected one of one hundred multiplexer boards. In practice, the battery voltage is read immediately prior to the reading of each line. This procedure is used for the sequential reading of all of the telephone lines, each telephone line reading being corrected by a correction factor computed from the current battery voltage reading and the relay coil resistance factor for the line being measured.

LINE IMPEDANCE CORRECTION

The correction for the slow drift in line resistance is also accomplished in the software and is shown in flow chart form in FIG. 3. Voltage on the line, which is a function of the number of switch closures at the remote site as well as the line impedance and leakage resistance, is measured as described in relation to the discussion of FIG. 2. This value, $Z_N$, where N is the number of the telephone line, is read into the computer at step 71 and corrected at step 72 to compensate for any instantaneous battery variations, as explained above. Next, the line leakage correction factor $K_{NL}$ is subtracted from $Z_N$ at stage 73 to reduce the measured value to a value corresponding to the actual resistance resulting from the resistances and switch closures at the remote site. At this point, the value is examined for high noise (such as from a ringing signal) or for phone off-hook conditions at step 74. If any of these conditions are present, the reading is skipped and a counter incremented at step 75 which records that the reading was bypassed. If the skipped value counter limit for the line is exceeded, an error condition is reported by the software.

Next, this computed resistance value ($F_{NC}$) is compared to a table of all possible resistance values. At this point, there are several possibilities.

If the system is working properly, and no switch has been closed or opened since the last iteration the difference between this reading and the last reading will be small. Therefore, the three cumulative data counters $A_n$, $B_n$ and $C_n$ need not be incremented, the line impedance correction factor should be updated, and the cycle is completed. This is accomplished as follows. In step 76 a table look up is used to determine the switch settings, the difference between the new and last line impedance is calculated, and a portion of this difference is added to the correction factor in step 79. In the preferred embodiment, one half of the difference is added. The data counters will be incremented if encoder state changes were detected (step 77). The cycle is now complete.

A problem may arise where the value of $Z_N$ computed in step 73 falls somewhere midway between the anticipated values (Table of $Z_{NS}$ values) based on the resistance at the remote site. If this should occur, it would indicate a large change in line impedance. In this case the system is no longer capable of determining whether a switch opening or closing has occurred. The program determines that the change of line impedance exceeds the predetermined limit in step 77, increments the marginal reading counter in step 80, updates the leakage correction factor $F_{NC}$ and exits. The marginal reading counter becomes an N indicator of line quality where a high count for a particular line indicates that the counter data $A_N$, $B_N$ and $C_N$ may be erroneous and that the equipment associated with those lines requires maintenance.

Because of the above stated problem, one or more counters may get out of sync. For a numerical example, actual changes between resistance values of ten and eleven thousand ohms may be interpreted as changes between the values of eleven and twelve thousand ohms. These encoder resistances may be re-synchronized by continually updating the leakage so that when the encoders reach the open states, the leakage correction factor is valid. It is helpful if these conditions, (i.e. all encoders at an open state) arise on a periodic basis which will typically be true since the monitored meters will have some usage.

The last possibility is that the table look-up at stage 76 detects a switch change. In this case, the corresponding counter (S), $A_N$, $B_N$ and/or $C_N$ will be incremented at stage 78. In all cases except for skipped readings, the correction factor $K_L$ is updated at step 79.

With the circuit of FIG. 2 and the software of FIG. 3, telephone lines become usable to detect switch closures at remote sites.

CALIBRATION

To install this system a precision resistance box is connected to the telephone line and set to the minimum resistance corresponding to all switches closed. The operator waits a time equal to several cycles to allow the computer to measure the line resistance. Next, the resistance box is set to the maximum value which corresponds to all switches open. Again the computer measures line resistance. At this point, the computer calculates and stores a value of $K_{NR}$, the series resistance correction factor and a factor $K_{NL}$ representing the initial line leakage. Now, when the actual resistance and switch mechanism is attached to the telephone lines, the computer begins to track the switch closures and maintain a running count for each switch. Finally, the operator reads the total count on the remote site meter and enters that into the computer.

The above described embodiments of this invention are merely descriptive of its principles and are not to be considered limiting. The scope of this invention instead shall be determined from the scope of the following claims, including their equivalents.

What is claimed is:

1. Apparatus for sensing at a central location events occurring at a plurality of remote sites comprising:
   one or several switches at each remote site, each switch adapted to change state at the occurrence of an event to be recorded;
   resistors associated with said switches for developing a resistance which is a function of said switch settings;
   telephone lines coupling said switches and resistors to said central location;
   a multiplexer for sequentially selecting each pair of telephone lines;
   a means for reading the electrical signal on the selected pair of telephone lines; and
   a computer for
   (1) computing from said signal the selected line impedance;
   (2) adding to said line impedance an impedance correction factor equivalent to the telephone line impedance deviation from nominal, resulting in a computed resistance which is a function of the switched resistance;
   (3) using large changes in said computed resistance as a data input; and
   (4) using small changes in said computed resistance to improve said impedance correction factor, thereby correcting for the change in telephone line impedance.

2. The apparatus of claim 1 wherein said apparatus includes precision resistance means initially connectable to said telephone line to set at least one standard impedance value of said telephone line, wherein said computer calculates a standard line impedance therefrom, and wherein said computer corrects said line impedance by means of an impedance correction factor representing the telephone line loop and leakage impedance deviation from said standard line impedance, and uses small changes in said computed impedance to improve the computed value of the impedance deviation from said standard line impedance for said telephone line.

3. The apparatus of claim 2 further comprising means for measuring the telephone line battery voltage and coupling said measurement to said computer, and wherein said computer further comprises means for applying a battery voltage correction factor, which is a function of the instantaneous battery voltage to the electrical signal read on each telephone line, which corrects each reading for battery voltage variations.

4. Apparatus for sensing at a central location events occurring at a plurality of remote sites comprising:
   one or several switches in series at each remote site, each switch adapted to change state at the occurrence of an event to be recorded;
   a resistor in parallel with each switch;
   telephone lines coupling said switches and resistors to said central location;
   a multiplexer at said central location for sequentially selecting each pair of telephone lines;

a means for reading the electrical signal on the selected pair of telephone lines; and a computer for
(1) computing from said signal the selected line impedance;
(2) correcting said line impedance by means of an impedance correction factor representing the telephone line impedance deviation from nominal, resulting in a computed line impedance which is a function of the switched resistance;
(3) using large changes in said computed impedance as an event input; and
(4) using small changes in said computed impedance to improve said impedance correction factor, thereby correcting for the changes in telephone line impedance.

5. The apparatus of claim 4 wherein said apparatus includes precision resistance means initially connectable to said telephone line to set at least one standard impedance value of said telephone line, wherein said computer calculates a standard line impedance therefrom, and wherein said computer corrects said line impedance by means of an impedance correction factor representing the telephone line loop and leakage impedance deviation from said standard line impedance, and uses a small changes in said computed impedance to improve the computed value of the impedance deviation from said standard line impedance for said telephone line.

6. The apparatus of claim 5 further comprising means for measuring the telephone line battery voltage and coupling said measurement to said computer, and wherein said computer further comprises means for applying a battery voltage correction factor, which is a function of the instantaneous battery voltage to the electrical signal read on each telephone line, which corrects each reading for battery voltage variations.

7. The apparatus of claim 6 wherein said multiplexer comprises an additional multiplexer input coupled to said battery voltage output.

8. The apparatus of claim 7 wherein said means for measuring further comprises a switch for coupling either the multiplexer output or the battery output to said means for reading and wherein said computer operates said switch prior to reading of said electrical signal on the selected pair of telephone lines whereby the instantaneous battery voltage just prior to reading is determined.

9. The method of using telephone lines at a central location to monitor switch settings at a plurality of remote sites, where the switches at each remote site are associated with resistors for developing a resistance which is a function of said switch settings, comprising the steps of:
sequentially measuring the total impedance of each remote site comprising the impedance of the telephone lines and each corresponding set of switches and resistors;
correcting said total impedance with one or more impedance correction factors, the result being a function of the switched resistance and the nominal telephone line impedances;
using large variations in corrected total impedance to indicate a changed switch setting; and
using small variations in corrected total impedance to improve one or more of said correction factors thereby correcting for the slow drift of impedance in the associated telephone line.

10. The method of claim 9 further comprising the step of measuring the telephone line battery voltage prior to sequentially measuring the total impedance of each set of telephone lines driven by said battery; and
using the battery correction factor to correct the reading which is a function of the total impedance to what it would have been when driven by a nominal battery voltage.

11. In a central system for monitoring the setting of switches in parallel or in series with resistances at a plurality of remote sites, using telephone lines for coupling the switches to said central system, where said central system comprises a multiplexer for sequentially selecting each set of telephone lines, apparatus comprising:
an analog to digital converter for receiving the multiplexer voltage output coupled from each selected telephone line and for converting said voltage into a computer-readable form; and
a computer
(1) for storing the analog to digital converter output, said output being a binary representation of the telephone line voltage which is a function of the remote site switch settings;
(2) for applying telephone line impedance correction factors (S) to the value of each telephone line voltage reading to compensate for differences in telephone line impedance from nominal values; and
(3) for using small changes in telephone line voltage between successive readings on the same telephone line to update the impedance correction factors (S) to compensate for slow changes in telephone line impedance.

12. The apparatus of claim 11 wherein said computer stores a standard value for the line impedance of each telephone line and compares a line impedance measured as a function of the line voltage from said analog to digital converter to develop said line impedance correction factor, and wherein said correction factor comprises a telephone line loop impedance correction factor and a telephone line leakage correction factor.

13. The apparatus of claim 12 further comprising:
means for measuring the telephone line battery voltage prior to measuring the voltage on those telephone lines powered by said battery and for coupling said measurement to said computer; and
wherein said computer further comprises means for applying a battery voltage correction factor to each telephone line voltage reading to correct said reading for the result of any differences of said battery voltage from its nominal voltage.

14. The apparatus of claim 13 wherein said means for measuring comprises an additional multiplexer input coupled to said telephone line battery output.

15. The apparatus of claim 14 wherein said means for measuring comprises a switch for coupling either the multiplexer output or the battery voltage to said analog to digital converter and means for operating said switch once for each reading of the electrical signal on the selected pair of telephone lines.

* * * * *